United States Patent
Mästle (10) Patent No.: US 7,755,758 B2
(45) Date of Patent: Jul. 13, 2010

(54) METHOD AND APPARATUS FOR OPTICAL SPECTRUM ANALYSIS

(75) Inventor: Rüdiger Mästle, Böblingen (DE)

(73) Assignee: Agilent Technologies, Inc., Santa Clara, CA (US)

( * ) Notice: Subject to any disclaimer, the term of this patent is extended or adjusted under 35 U.S.C. 154(b) by 196 days.

(21) Appl. No.: 11/731,103

(22) Filed: Mar. 30, 2007

(65) Prior Publication Data

US 2007/0201026 A1 Aug. 30, 2007
US 2010/0141943 A9 Jun. 10, 2010

Related U.S. Application Data

(63) Continuation of application No. PCT/EP2004/052401, filed on Oct. 1, 2004.

(51) Int. Cl.
*G01J 3/28* (2006.01)
(52) U.S. Cl. .................................................. 356/328
(58) Field of Classification Search .................. 356/326, 356/328
See application file for complete search history.

(56) References Cited

U.S. PATENT DOCUMENTS

| 5,233,405 A | 8/1993 | Wildnauer et al. |
| 6,262,822 B1 | 7/2001 | Obhi et al. |
| 6,714,298 B2 * | 3/2004 | Ryer ........................ 356/328 |

FOREIGN PATENT DOCUMENTS

| EP | 0 875 743 A | 11/1998 |
| WO | WO 01/63230 | 8/2001 |

* cited by examiner

*Primary Examiner*—F. L Evans (57) ABSTRACT

The present invention relates to an apparatus and to a method of optical spectrum analysis of an optical spectrum of a light beam (4), comprising the steps of selecting a certain part of the optical spectrum of the light beam (4) to provide a filtered light beam (12), detecting the filtered light beam (12) to provide an electrical signal corresponding to a power amplitude ($O(\lambda)$) of the filtered light beam (12), detecting the filtered light beam (12) to provide an electrical signal corresponding to a wavelength of the filtered light beam (12), and providing the power amplitude as a function of the wavelength of the filtered light beam (12).

11 Claims, 6 Drawing Sheets

METHOD AND APPARATUS FOR OPTICAL SPECTRUM ANALYSIS

This application is a continuation of, and claims the benefit of International Application No. PCT/EP2004/052401, filed on 1 Oct. 2004 which designated the United States of America, and which international application was published as Publication No. WO 2006/037373.

BACKGROUND OF THE INVENTION

The present invention relates to optical spectrum analysis of an optical signal.

Optical spectrum analysis serves to analyze an unknown spectrum to determine the power of certain wavelengths of the spectrum. For such an analysis it is normally used an optical spectrum analyzer (OSA) which typically comprises a pivotable grating. The grating serves to disperse the light under measurement and so to select a certain wavelength of the spectrum. By pivoting the grating the spectrum can be analyzed. To allocate a certain wavelength to a certain pivot angle it is necessary to calibrate the OSA in advance. For such a calibration sharp laser lines, gas absorption lines or reflection lines of fiber Bragg gratings or Fabry-Perot filters with a known wavelength are usually used.

The resolution bandwidth (RBW) of such an OSA is substantially given by the formula RBW=$\lambda$/(n N), with $\lambda$ being the wavelength, N being the number of grating passes, and n being the number of illuminated grating lines. In known OSAs, such as the 8614xA of Agilent Technologies Inc., a Delaware Corporation, Palo Alto, Calif. 94303, USA, the RBW can be around 40 pm. Generally, there are two principle ways to enhance the RBW of such an OSA. First, to increase the number of the illuminated lines, i.e., Increase the size of the grating, or second, to increase the number of grating passes, i.e., increase complexity.

SUMMARY OF THE INVENTION

It is an object of the invention to provide improved optical spectrum analysis of an optical signal.

The object is solved by the independent claims.

The present invention comprises the perception that a prior art OSA has limited wavelength accuracy. In known OSAs the wavelength accuracy is about 10-20 pm. Furthermore, since the calibration result of the OSA is dependent on ambience parameters, e.g. the temperature in the ambience of the OSA, the accuracy of the OSA results are worsening rapidly with time because of a change of such parameters with time.

Moreover, the afore mentioned accuracy of prior art OSAs is only present in the vicinity of about 10-20 nm of a wavelength used for calibration. In greater distances from the calibration wavelength the accuracy is also worsening and can be as low as 100-200 pm.

Since embodiments of OSAs of the present invention use a determination of the wavelength of the filtered light beam, e.g. the output of a diffractive or dispersive element, e.g. a grating, the afore mentioned problems of the prior art OSAs do not occur.

It is therefore an advantage of such embodiments that the accuracy of the finally determined wavelength is about significant higher than of a prior art OSA, i.e., the wavelength accuracy of embodiments of the present invention can be as high as 1-2 pm.

Additionally, the wavelength accuracy of inventive embodiments is independent of any time dependent behavior of the used dispersive element, but is only dependent on the accuracy of the calibration of the wavelength detection unit used for the determination of the wavelength of the output of the dispersive element. This is because according to embodiments of the present invention the wavelength determination of the output is not restricted to be done in advance of an OSA measurement but can be done parallel to or simultaneously with the action of the dispersive element. Such embodiments therefore provide an inherently and continuously calibrated measurement result due to the integrated determination of the wavelength of the output of the dispersive element.

Since wavelength detection units can be calibrated with a higher accuracy than known OSAs, embodiments of the present invention enable the afore mentioned strong enhancement of the possible wavelength accuracy down to 1-2 pm.

In a preferred embodiment of the present invention a diffractive grating is used as a dispersive element.

It is preferred to evaluate the wavelength of the output of the dispersive element by determining the center of gravity wavelength or average wavelength of the output. This is advantageous because the normal spectrum to be analyzed is not like a sharp signal of a laser but will show a certain bandwidth. Therefore, the output of the dispersive element will show a certain bandwidth, also. Therefore, it is preferred to determine the average wavelength of the output.

Preferably, to implement the determination of the average wavelength $\lambda_{average}$ of the output the output $O(\lambda)$ is folded with a transfer function $T(\lambda)$ according to the following formula: $\lambda_{average} = \int (T(\lambda) O(\lambda)) d\lambda$.

The transfer function $T(\lambda)$ is preferably linear or nearly linear to enhance the accuracy of the average wavelength $\lambda_{average}$.

In a preferred embodiment of the present invention the transfer function $T(\lambda)$ is realized by using at least two cyclical or periodic functions which are phase shifted with respect to each other. Using such periodic functions is advantageous with respect to a simple linear filter because the wavelength resolution of such functions is higher. However, the use of a simple linear filter is also possible.

To realize such a periodic transfer function an embodiment of the present invention uses at least two etalons which have a slightly different thickness with respect to each other in the direction of the output beam of the dispersive element. Each etalon generates then a periodic output which due to the differing thickness are shifted with respect to each other. Preferably, such output power or transmission power of each etalon is then normalized to the whole detected power from each etalon. On the basis of such normalized transmission power it is then possible within the free spectral range (FSR) of each etalon to precisely determine the wavelength of the output of the dispersive element.

With other words: the etalons and respective power detectors serve as a wavelength detection unit to determine the accurate wavelength of the output of the dispersive element.

An example of such etalons is given in applicants EP 0 875 743 B1 the disclosure of which is fully incorporated herein by reference. However, instead of etalons any other birefringent element, such as retardation plates or wave plates or any other optical element or system which has a periodic or nearly periodic transfer function with respect to the wavelength can be used for the purposes of the present invention. Also, it is possible to use any other known wavelength detection unit, e.g. a Michelson interferometer.

When using such periodic transfer functions it is preferred to select among the periodic peaks the peak within the correct FSR by using a selective element. The correct FSR is the FSR corresponding to the wavelength of the filtered light beam, the FSR, which comprises the wavelength of the filtered light beam. Such a selection roughly indicates the correct wavelength and therefore enables to choose the correct FSR comprising the desired peak. Such a selective element can be an edge filter or any other means indicating a rough estimation of the wavelength.

However, for the present invention it is preferred to use the preselection of the dispersive element to select the correct FSR comprising the desired peak.

Moreover, it is preferred to use a spectral bandwidth of the output signal of the dispersive element, which is, e.g. at least 10 times, smaller than the periodicity of the periodic transfer function to cause interference by the birefringent element.

It is also preferred to use a bandwidth of the output signal of the dispersive element, which is, e.g. at least 20-40 times, smaller than the FSR of the periodic transfer function to be able to have at least one peak within the FSR.

Other preferred embodiments are shown by the dependent claims.

The invention can be partly embodied or supported by one or more suitable software programs, which can be stored on or otherwise provided by any kind of data carrier, and which might be executed in or by any suitable data processing unit. Software programs or routines are preferably applied to the realization of the inventive method.

BRIEF DESCRIPTION OF THE DRAWINGS

Other objects and many of the attendant advantages of the present invention will be readily appreciated and become better understood by reference to the following detailed description when considering in connection with the accompanied drawings. The components in the drawings are not necessarily to scale, emphasis instead being placed upon clearly illustrating the principles of the present invention. Features that are substantially or functionally equal or similar will be referred to with the same reference sign(s).

DETAILED DESCRIPTION OF PREFERRED EMBODIMENTS OF THE INVENTION

Figure 1:
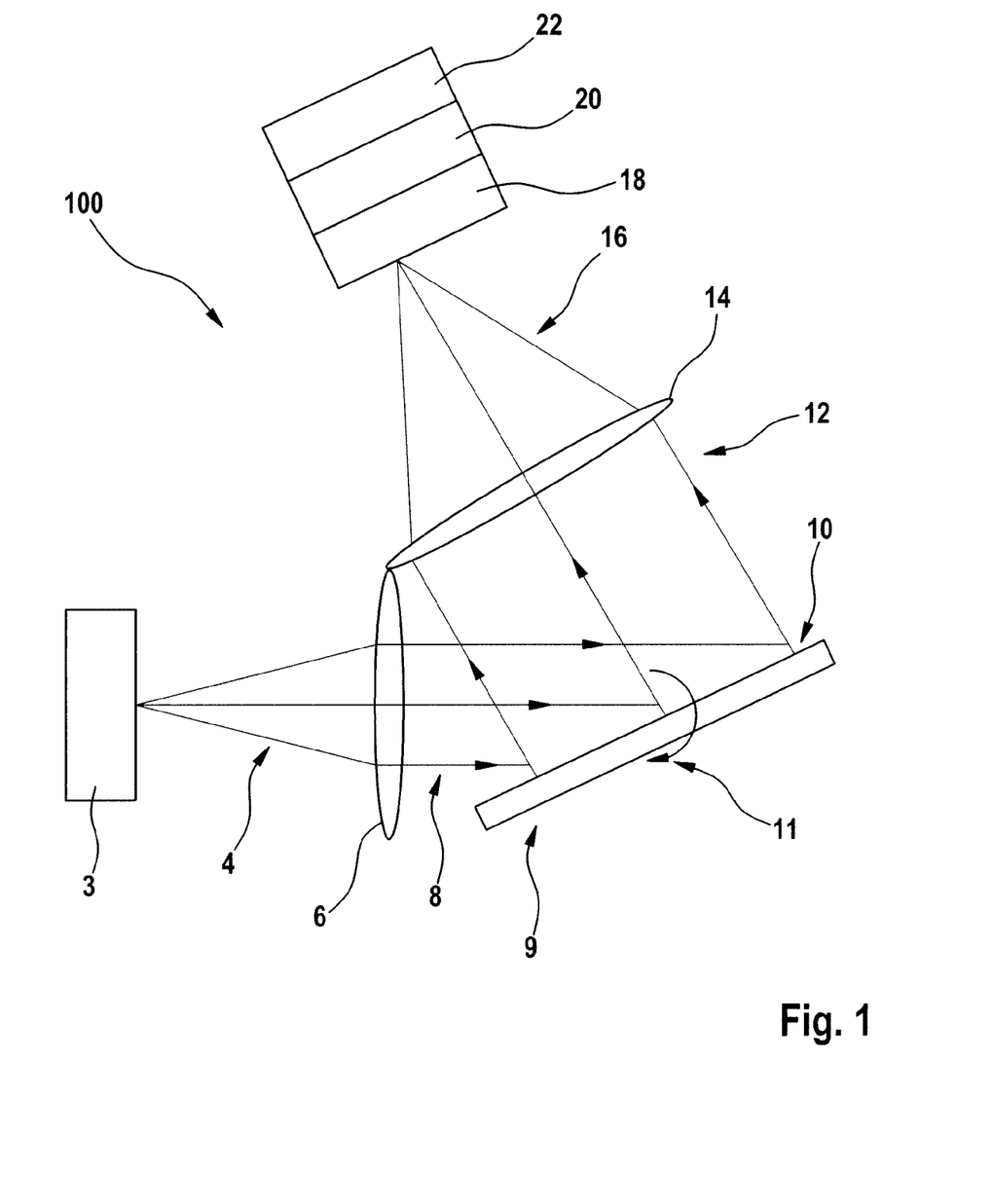
FIG. 1 shows a schematic illustration of a preferred embodiment of the present invention.

Referring now in greater detail to the drawings, FIG. 1 shows a schematic illustration of an apparatus 100 for optical spectrum analysis of an optical spectrum of a light beam 4 according to a preferred embodiment of the present invention. Apparatus 100 generally can be defined as an OSA since apparatus 100 functions as a known OSA but has the additional inventive features described below. Therefore, for simplification purposes, the drawings and the following description of the drawings do not describe in detail generally known features of an OSA. However, such known features are forming a part of apparatus 100 of FIG. 1, if necessary. Such known features of an OSA are for example disclosed in U.S. Pat. No. 5,233,405, the disclosure of which is fully incorporated herein by reference.

An unknown light beam 4 under measurement is coming from a source 3. The light beam 4 under measurement is provided to a lens 6 to collimate the original light beam 4 into a collimated light beam 8. The collimated light beam 8 is provided to a selective element 9 for selecting a certain part of the optical spectrum of the light beam 8 to provide a filtered light beam 12. The selective element 9 comprises as a dispersing element a diffractive grating 10 acting as a variable filter for providing a variable filtering of the collimated light beam 8 for selecting the certain part of the optical spectrum of the collimated light beam 8.

To provide such a filtering the diffractive grating 10 is diffracting different parts of the optical spectrum of the collimated light beam 8 at different angles to provide a spatially dispersed light beam and to select a certain spatial part of the spatially dispersed light beam to finally provide the filtered light beam 12.

The part of the optical spectrum of collimated light beam 8 that will be selected by the grating 10 can be chosen by turning the grating 10 according to arrow 11 of FIG. 1.

After such a selection the filtered light beam 12 is provided to a lens 14 to focus the filtered light beam 12 into a filtered and focused light beam 16. Lens 14 focuses the filtered and focused light beam 16 on a wavelength detection unit 18.

By adding further optical elements the grating 10 can be hit multiple times by the input light beam 4 or the filtered light beam 12 to increase dispersion and thus to improve resolution of the instrument. These more complicated setups are functional equivalent to the simplified structure shown in FIG. 1 in delivering a filtered beam with narrow spectral bandwidth. Therefore, FIG. 1 should be understood as an example for an variable optical filter and the invention is not limited to such simple structures. So only for simplicity in the following it will be referred to the notations in FIG. 1.

The function of the wavelength detection unit 18 is as follows:

To evaluate the wavelength of the filtered and focused light beam 16 which is the output of the grating 10 the center of gravity wavelength or average wavelength of this output is determined. This is done because normally a spectrum to be analyzed will not be like a sharp signal but will show a certain bandwidth. Therefore, the output of the grating 10 will show a certain bandwidth, also.

To implement the determination of the average wavelength $\lambda_{average}$ of an output $O(\lambda)$ of the grating 10 the output $O(\lambda)$ is folded with a transfer function $T(\lambda)$ according to the following formula: $\lambda_{average} = \int (T(\lambda) O(\lambda)) d\lambda$.

The transfer function $T(\lambda)$ is nearly linear to enhance the accuracy of the average wavelength $\lambda_{average}$. The transfer function $T(\lambda)$ is realized by using two periodic functions which are phase shifted with respect to each other. Alternatively, a simple linear filter can be used. To realize such a periodic transfer function $T(\lambda)$ the wavelength detection unit 18 of the embodiment of FIG. 1 comprises two not shown but known etalons which have a slightly different thickness with respect to each other in the direction of the filtered and focused light beam 16 coming from lens 14. Each etalon generates then a periodic output which outputs are shifted with respect to each other due to the differing thickness of the etalons.

Figure 2:
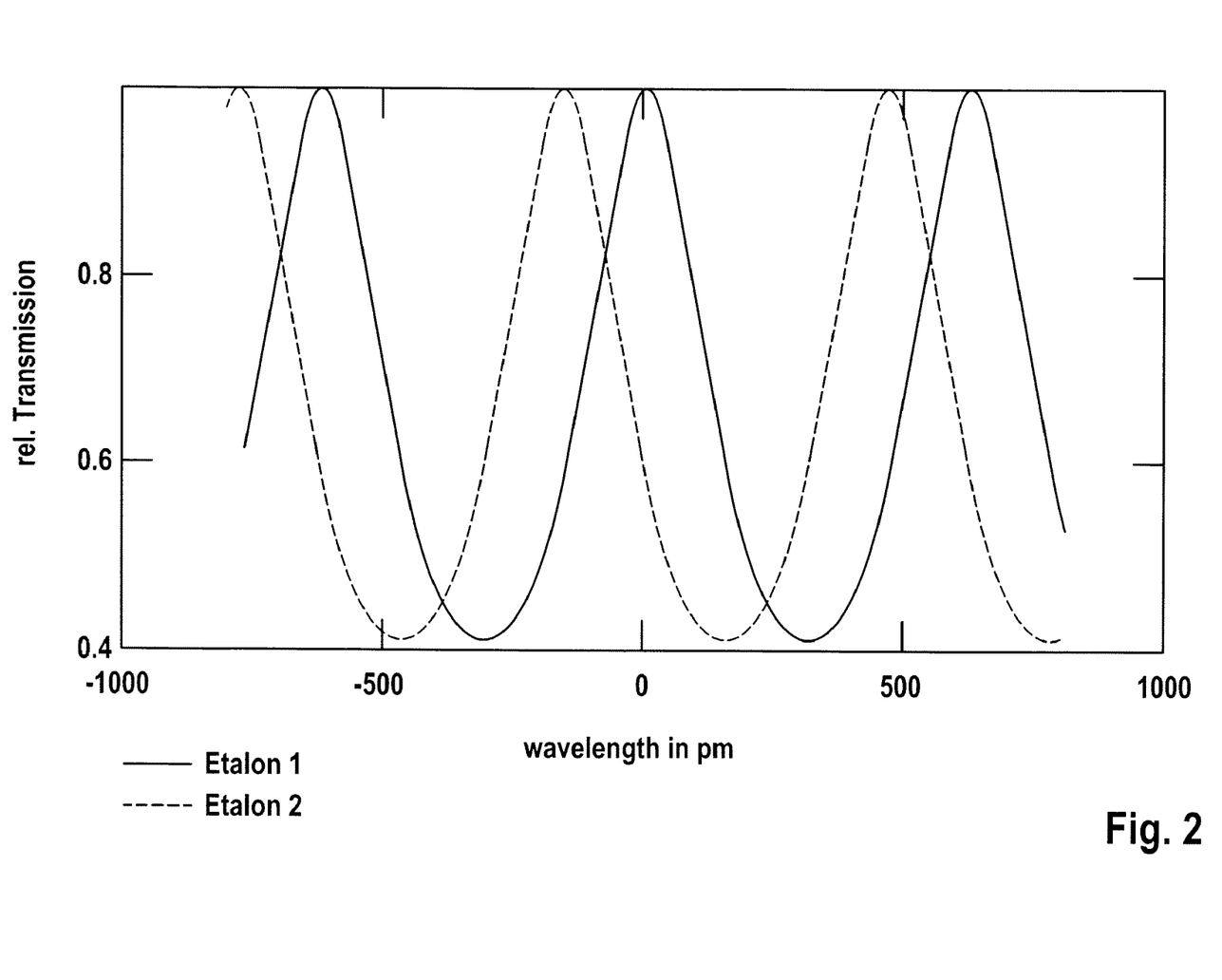
FIG. 2 shows relative transmissions of two etalons of the preferred embodiment of FIG. 1.

FIG. 2 shows a graph which displays the relative transmission of an etalon 1 and of an etalon 2. These outputs are detected by a not shown but known power detector which also forms a part of the wavelength detection unit 18. An example of such etalons and such a power detector is given in applicants EP 0 875 743 B1 the disclosure of which is fully incorporated herein by reference.

To know the relative transmission of each etalon 1 and 2 as shown in FIG. 2, the transmission power of each etalon 1 and 2 is normalized to the whole detected power from each etalon. The whole power of each etalon 1 and 2 is also detected by the power detector. On the basis of such normalized or relative transmission power it is then possible within a free spectral range (FSR) of each etalon 1 and 2 to precisely determine the wavelength of the filtered and focused light beam 16 coming from the grating 10. The two etalons 1 and 2 and the respective power detector together form the wavelength detection unit 18.

Alternatively, instead of etalons any other optical elements with two beam or multiple beam interference or any birefringent elements, such as retardation plates or wave plates can be used. Also, it is possible to use any other known wavelength detection unit, e.g. a Michelson interferometer.

Since the etalons provide a periodic transfer function it is necessary in the shown embodiment of FIG. 1 to select among the periodic peaks of FIG. 2 the peak within the correct FSR by using a selective element. The correct FSR is the FSR corresponding to the wavelength of the filtered and focused light beam 16, i.e., the FSR which comprises the wavelength of the filtered and focused light beam 16. Such a selection roughly indicates the correct wavelength and therefore enables to choose the correct FSR comprising the desired peak of the peaks shown in FIG. 2. Such a selective element can be a not shown edge filter or any other means indicating a rough estimation of the wavelength.

In the embodiment of FIG. 1 the grating 10 is used to select the correct FSR comprising the desired peak. To realize this the grating 10 is positioned in a known way to provide a certain wavelength. This positioning can be done in a known way since apparatus 1 in this respect corresponds to a known OSA. In the known way the angle of turning according to arrow 11 of FIG. 1 is used to roughly determine the wavelength of the filtered and focused light beam 16. This is possible if the selective element 10 was calibrated in a known way so that there is a known relation between the angle of the turning according to arrow 11 and the wavelength of the focused and filtered light beam 16. This calibration information is stored in a not shown memory of an evaluation unit 20. The evaluation unit 20 is connected to the wavelength detection unit 18 and to a not shown angle detector for detecting the turning angle of grating 10. As soon as the evaluation unit 20 receives information about the angle of the grating 10 from the angle detector the evaluation unit 20 can use the stored calibration information to roughly determine the wavelength of the filtered and focused light beam 16.

The wavelength detection unit 18 provides an electrical signal to the evaluation unit 20 which electrical signal is corresponding to signals of the two etalons 1 and 2 according to FIG. 2. On the basis of the provided electrical signals the evaluation unit 20 then can provide the power amplitude of the filtered and focused light beam 16 as a function of the wavelength of the filtered and focused light beam 16.

The apparatus 100 may optionally include a calibration unit 22 for providing a relation between an angle provided by the angle detector for detecting the turning angle of the diffracting grating 10 and the wavelength of the filtered light beam 12. The apparatus 100 may also optionally include a control unit 22 for controlling the variable filtering of the optical spectrum of the light beam 4 based on the electrical signal from the wavelength detection unit 18 in a closed loop operation.

To cause interference by the etalons 1 and 2 the filtered and focused light beam 16 has a bandwidth, which is, e.g. ten times, smaller than a periodicity of the periodic transfer function of FIG. 2 of the etalons 1 and 2. To be able to select the correct peak within the FSR of the etalons 1 and 2 the filtered and focused light beam 16 is provided with a bandwidth which is, e.g. 20 times, smaller than the FSR of the periodic transfer function of the etalons 1 and 2.

FIG. 3-FIG. 10 show graphs, which are displaying effects of the embodiment according to FIG. 1.

Figure 3:
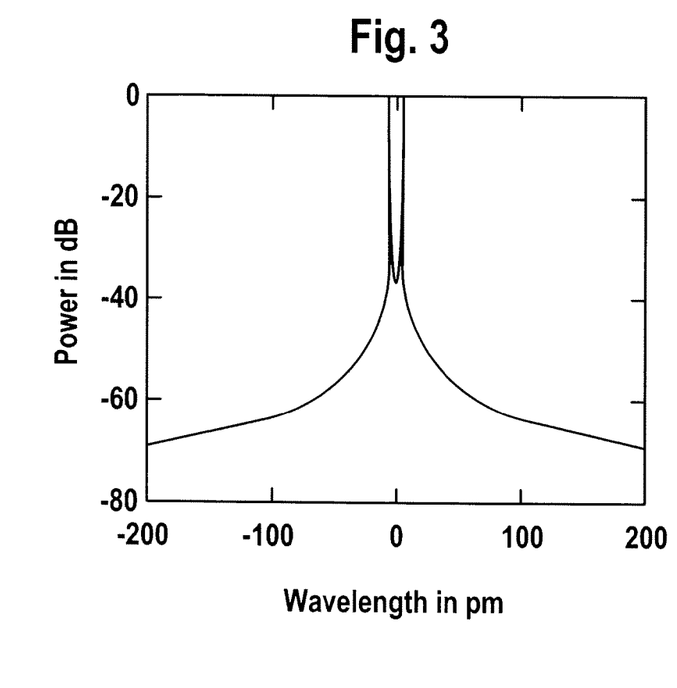
FIG. 3-10 show graphs displaying effects of the embodiment of FIG. 1.

FIG. 3 shows a graph which displays the power amplitude measured in dB over the relative wavelength measured in pm of the incoming light beam 4. The graph of FIG. 3 shows that the incoming light beam 4 has two sharp peaks, which are as close as 0.5 RBW together.

Figure 4:
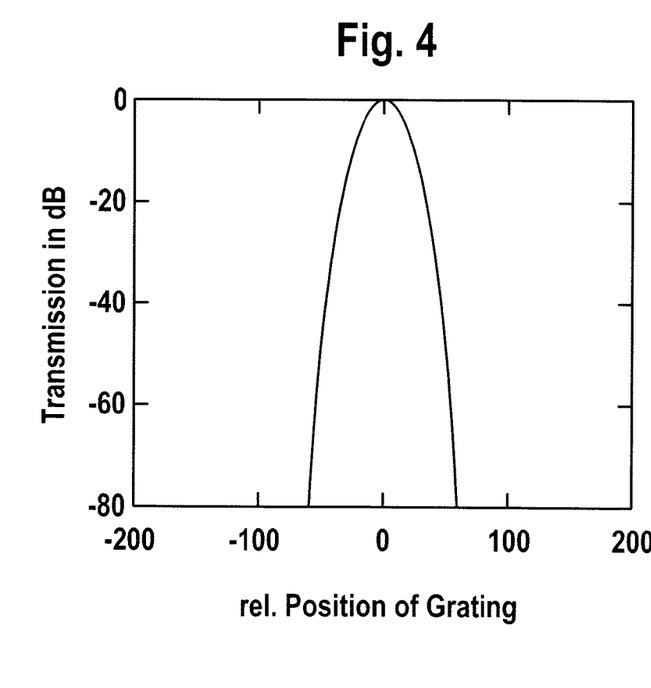

FIG. 4 shows the transmission power amplitude of grating 10 measured in dB over the relative position of the grating 10, i.e., FIG. 4 shows the filter profile of grating 10.

Figure 5:
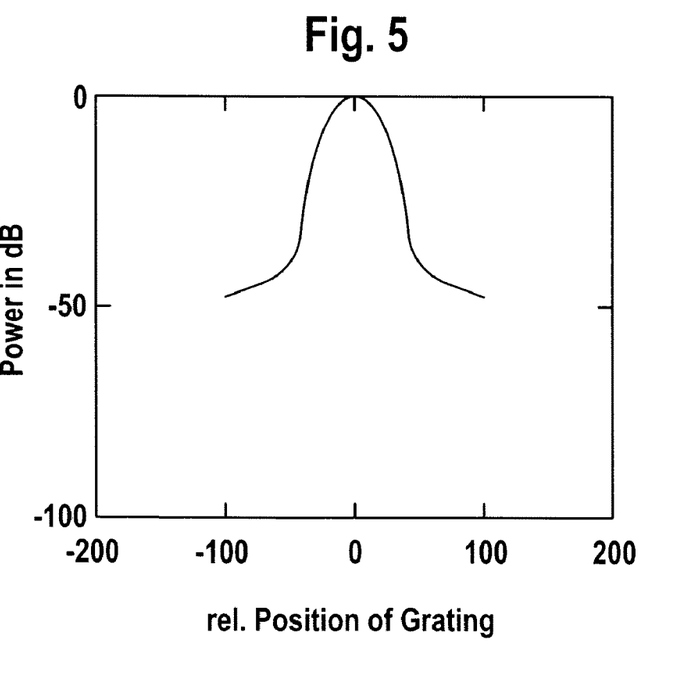

FIG. 5 shows the power amplitude of the filtered and focused light beam 16 measured in dB by wavelength detection unit 18 over the relative position of grating 10. FIG. 5 shows clearly a single peak, which is the average wavelength of the filtered and focused light beam 16 determined by wavelength detection unit 18 and evaluation unit 20.

Figure 6:
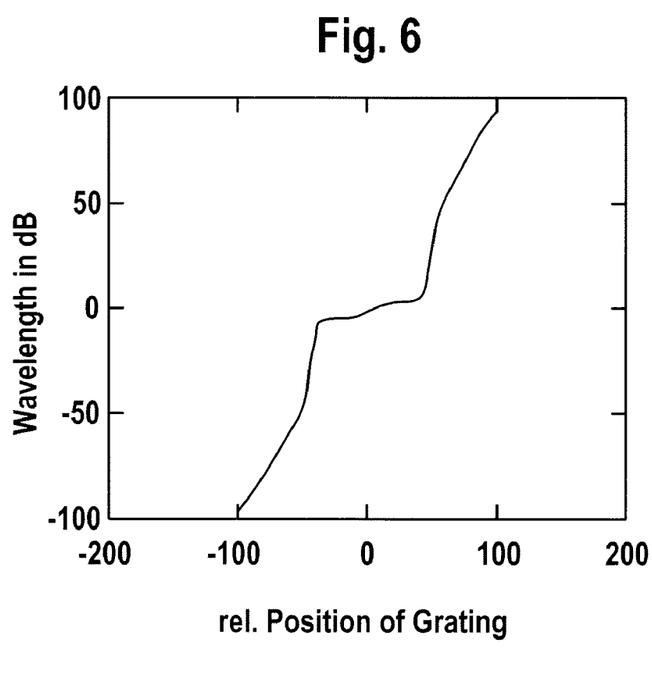

FIG. 6 shows the relative wavelength measured in pm over the relative position of the grating 10. FIG. 6 shows that the slope of the measured curve is nearly zero within the area of the peak of FIG. 5. The present invention comprises the perception that the more the slope of FIG. 6 comes close to zero within the area of the peak of FIG. 5 the higher is the accuracy of the measured wavelength of FIG. 5. Therefore, the highest accuracy of the measured wavelength of FIG. 5 is present if the slope in FIG. 6 within the area of the peak of FIG. 5 is close to zero or zero.

Figure 7:
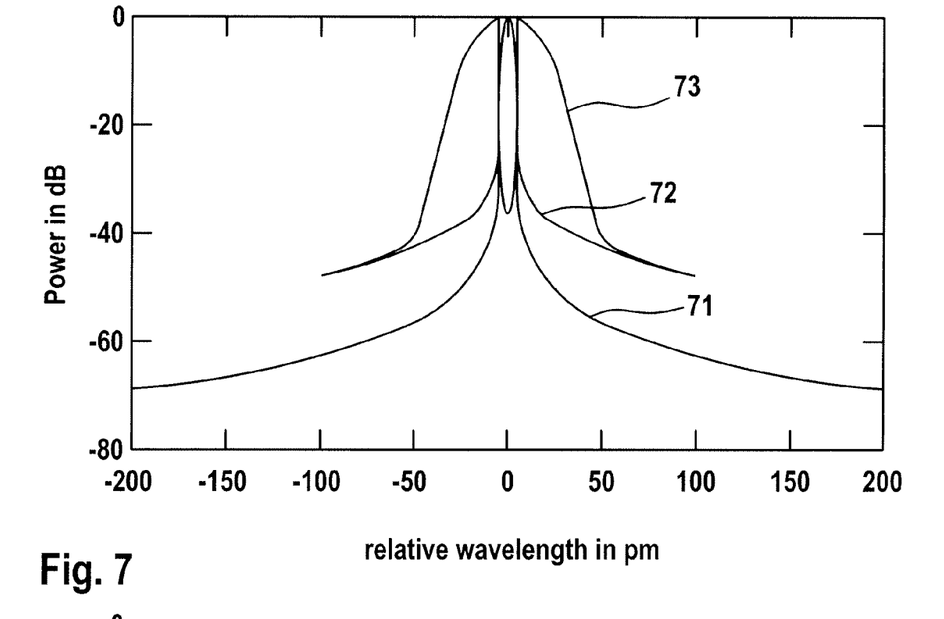

FIG. 7 shows on the y-axis the power amplitude measured in dB of the filtered and focused light beam 16 over the relative wavelength measured in pm on the x-axis. The graph of FIG. 7 shows three curves 71-73. The lowest curve 71 is the optical spectrum of the incoming light beam 4 corresponding to the incoming spectrum of FIG. 3. The uppermost curve 73 is the curve of FIG. 5.

In the middle of the graph there is shown a third curve 72. This third curve 72 displays a reconstructed or corrected power amplitude of the detected filtered and focused light beam 16 over the relative wavelength. Such a correction can be done if there are some values in the uppermost optical spectrum of the FIG. 7, which values show a wavelength accuracy which is higher than the average wavelength accuracy of the measured spectrum. Such values can be used for calibration purposes. Values which show higher accuracy are values in the spectrum which are less dependent on other spectral parts of the uppermost spectrum of FIG. 7 than other values in the uppermost spectrum of FIG. 7. In other words: values to be used for calibration purposes should be values of the uppermost spectrum of FIG. 7 which are not or only negligible changing if other spectral parts of the uppermost spectrum of FIG. 7 are changing.

Figure 8:
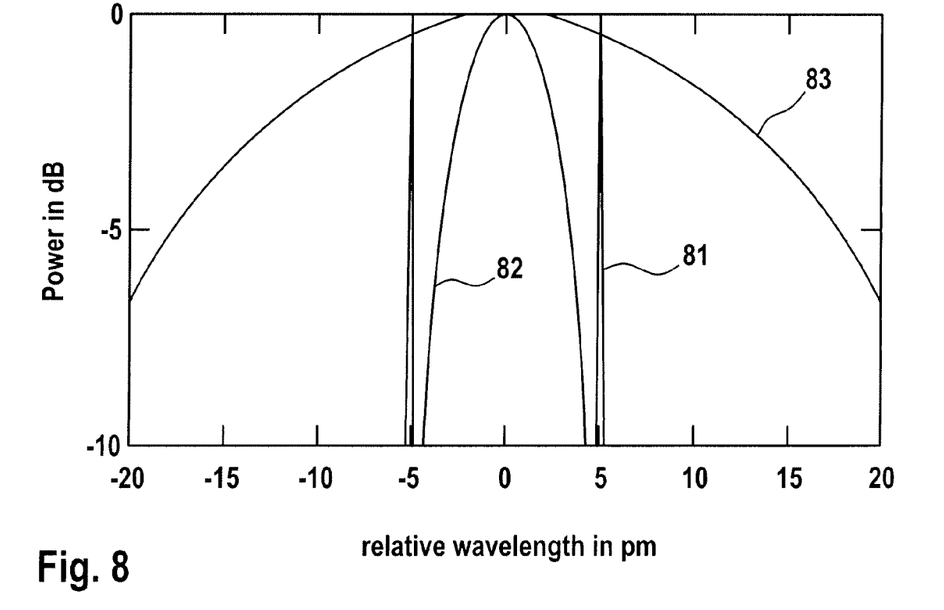

FIG. 8 shows an enlargement of the top and middle part of FIG. 7, wherein curves (or spectra) 81, 82 and 83 represents enlarged parts of curves 71, 72 and 73 respectively. It can be seen in FIG. 8 that the corrected spectrum 82 in the middle of FIG. 8 is sharper than the not corrected uppermost spectrum 83 of FIG. 8. However, the corrected spectrum in the middle of FIG. 8 does not have two peaks as the incoming spectrum 81 showing two sharp peaks in FIG. 8. Of course, it is desirable to be able to provide a correction so that the resolution is high enough to see two peaks in the detected spectrum.

Figure 9:
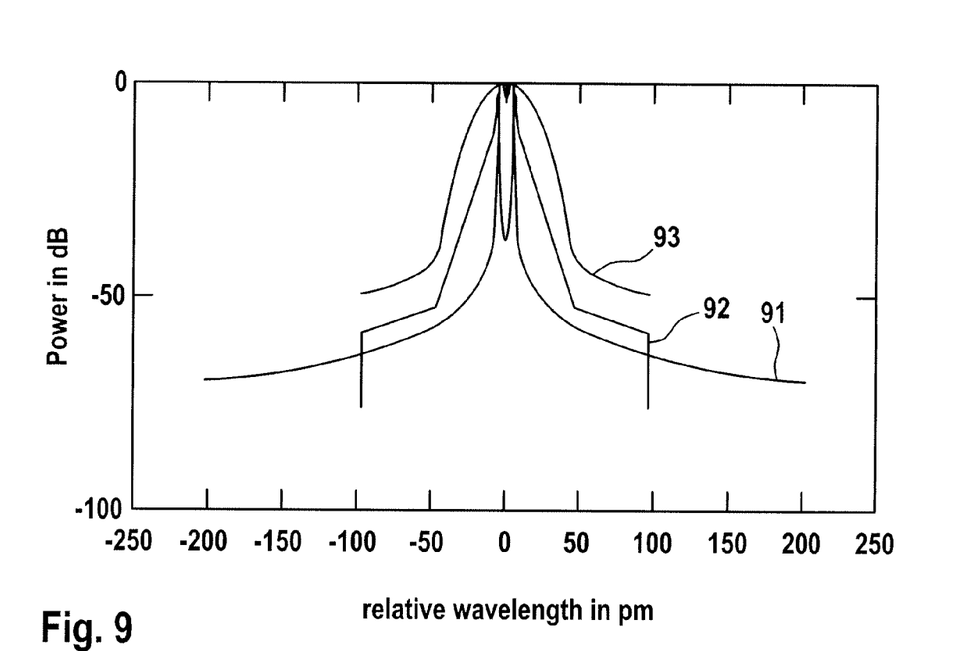

The graph of FIG. 9 shows three curves 91-93. The lowest curve 91 is the optical spectrum of the incoming light beam 4 and corresponds to curve 71 of FIG. 7. The uppermost curve 93 corresponds to curve 73 of FIG. 7.

To provide such a second correction evaluation unit 20 evaluates the density of the measured values on the x-axis, i.e., the axis of the relative wavelength. With such a measure it is possible to enhance resolution and to see two peaks in the therefore twice corrected resulting optical spectrum 92 of filtered and focused light beam 16 according to FIG. 9 which corresponds to FIG. 7.

Figure 10:
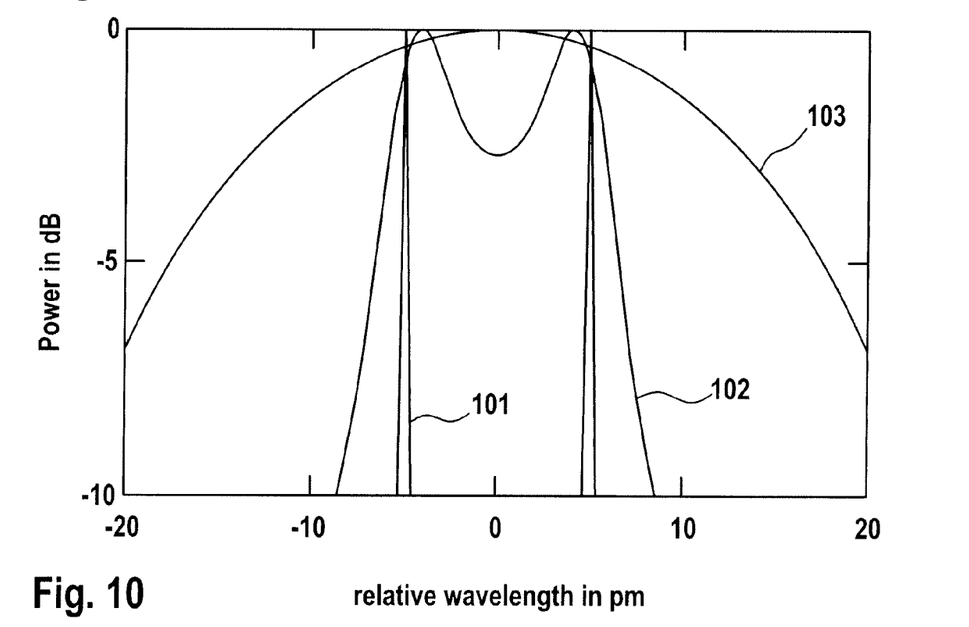

FIG. 10 shows an enlargement of the top and middle part of FIG. 9, wherein curves (or spectra) 101, 102 and 103 represents enlarged parts of curves 91, 92 and 93 respectively. In the enlargement of the top and middle part of FIG. 9 according to FIG. 10 there are two peaks in the resulting spectrum 102, which two peaks are very close to the two sharp peaks of the spectrum 101 of the incoming light beam 4.

Therefore, the present invention comprises also measures to provide a second correction of the measured spectrum of filtered and focused light beam 16 so that peaks of the incoming light beam 4 with a distance of as low as 0.5 RBW can be separately displayed in the detected spectrum of filtered and focused light beam 16. This means that the present invention can generate an accuracy of the detected wavelength of as high as 1-2 pm.

The wavelength detection unit is more sensitive to adjacent peaks in the light spectrum under measurement compared to the power detection unit (i.e. the power of adjacent peaks are not detected as different peaks but as one single peak, if the wavelength distance falls within the range of the measurement aperture). In a further embodiment, the resolution of the measurement is enhanced without reducing the aperture. Therefore, the information of the wavelength measurement is used to improve the power measurement resolution. The two signals derived from both the power and the wavelength measurement, or any signals derived there from can be used as input values for a direct or iterative deconvolution procedure for correcting an impact of a filter shape of the variable filter on the power amplitude as a function of the wavelength of the filtered light beam 12.

However, as input values for such a deconvolution procedure not necessarily power and wavelength information must be used, but any at least two input signals, derived from applying appropriate different periodic spectral weighting functions to optical signals and subsequent detecting these two signals can be used.

What is claimed is:

1. A method of optical spectrum analysis of an optical spectrum of a light beam, comprising:
    using a selective element to variably filter the light beam to obtain a filtered light beam of a desired wavelength,
    using a wavelength detection unit to determine from the filtered light beam itself a wavelength of the filtered light beam,
    using a detector of the wavelength detection unit to obtain a power amplitude of the of the filtered light beam, and
    using an evaluation unit to associate the power amplitude of the filtered light beam with the determined wavelength of the filtered light beam.

2. A software program or product, store on a computer readable medium, for executing the method of claim 1 when run on a data processing system.

3. An apparatus for optical spectrum analysis of an optical spectrum of a light beam, comprising:
    a selective element for variably filtering the light beam to obtain a filtered light beam of a desired wavelength,
    a wavelength detection unit for receiving the filtered light beam and providing an electrical signal corresponding to the wavelength of the received filtered light beam, the wavelength detection unit further comprising a detector for obtaining a power amplitude of the filtered light beam,
    and
    an evaluation unit that determines from the electrical signal a wavelength of the filtered light beam that is associated with the obtained power amplitude.

4. The apparatus of claim 3, wherein the selective element comprises a dispersive element for diffracting different parts of the optical spectrum of the light beam at different angles to provide a spatially dispersed light beam, and for selecting a certain spatial part of the spatially dispersed light beam to provide a filtered light beam.

5. The apparatus of claim 4, further comprising:
    a calibration unit for providing a relation between an angle provided by an angle detector for detecting the turning angle of the dispersive element and the determined wavelength of the filtered light beam.

6. The apparatus of claim 3, further comprising:
    a control unit for controlling the variable filtering of the optical spectrum of the light beam based on the electrical signal in a closed loop operation.

7. The apparatus of claim 3, wherein the evaluation unit determines one of a center of gravity wavelength and an average wavelength of the filtered light beam based on the electrical signal.

8. The apparatus of claim 3, wherein the wavelength detection unit comprises:
    two birefringent elements having a different thickness with respect to each other in the direction of the filtered light beam in order to realize at least two different transfer functions.

9. The apparatus of claim 8, whereby each of the least two birefringent elements comprises at least one of the following:
    a etalon,
    a retardation plate, and
    a wave plate.

10. The apparatus of claim 3, whereby the evaluation unit uses the electrical signal and the obtained power amplitude of the filtered light beam in a direct or iterative deconvolution procedure for correcting an impact of a filter shape of the selective element on the power amplitude.

11. The apparatus of claim 7, wherein the evaluation unit determines the one of a center of gravity wavelength and an average wavelength of the filtered light beam by folding the filtered light beam with a transfer function of the wavelength determination unit.

* * * * *